(12) United States Patent
Lovejoy et al.

(10) Patent No.: US 8,439,418 B1
(45) Date of Patent: May 14, 2013

(54) ILLUMINATED SHELF VEHICLE STORAGE COMPARTMENT

(75) Inventors: Megan Lovejoy, Dearborn, MI (US); Irene Shu, Canton, MI (US); Cornel Lewis Gardner, Romulus, MI (US); Denis Patrick Igoe, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/324,294

(22) Filed: Dec. 13, 2011

(51) Int. Cl.
*B60R 7/06* (2006.01)

(52) U.S. Cl.
USPC .......................... 296/37.12; 362/489

(58) Field of Classification Search .. 296/37.12; 362/92, 362/93, 94, 137, 133, 488, 489; 312/223.5; 248/250; 428/68; 108/23, 44, 45
See application file for complete search history.

(56) References Cited

U.S. PATENT DOCUMENTS

| | | | |
|---|---|---|---|
| 6,210,013 B1 * | 4/2001 | Bousfield | 362/92 |
| 6,231,099 B1 | 5/2001 | Greenwald | |
| 6,315,436 B1 | 11/2001 | Schenk et al. | |
| 7,163,305 B2 | 1/2007 | Bienick | |
| 7,192,074 B2 * | 3/2007 | DePue et al. | 296/37.9 |
| 7,201,487 B2 | 4/2007 | Pinter | |
| 7,370,500 B2 | 5/2008 | Kapteyn | |
| 7,670,022 B2 * | 3/2010 | Kessler et al. | 362/153 |
| 2001/0030878 A1 | 10/2001 | Baldwin | |
| 2002/0159741 A1 | 10/2002 | Graves et al. | |
| 2004/0246741 A1 | 12/2004 | You et al. | |
| 2009/0021927 A1 | 1/2009 | Hall et al. | |
| 2009/0133302 A1 | 5/2009 | Huynh et al. | |
| 2010/0154261 A1 | 6/2010 | Bozlo et al. | |
| 2010/0195350 A1 | 8/2010 | Schattinger et al. | |

FOREIGN PATENT DOCUMENTS

JP 4323208 B2 9/2009

OTHER PUBLICATIONS

"Modern Interior Design Trends," http://trend-dir.net/modern/interior-designs/shown-light-with-glass-shelves, Modern Interior Design Trends Copyright © 2011, 4 pages.
Light Enhancing Designs LED Kits, "LED Lighting Kits and LED Shelf Lighting!" http://www.ledshelf.com, Copyright © 2008 Light Enhancing Designs, 1 page.
G. Michael Morris et al., "Engineered Diffusers for Display and Illumination Systems: Design, Fabrication, and Applications," RPC Photonics, www.RPCphotonics.com, www.physics.uci.edu/~isis/Yountville/Sales.pdf, Copyright © 2007-2011 RPC Photonics, 11 pages.

* cited by examiner

*Primary Examiner* — Joseph Pape
*Assistant Examiner* — Dana Ivey
(74) *Attorney, Agent, or Firm* — Vichit Chea; Price Heneveld LLP

(57) ABSTRACT

A vehicle storage compartment is provided having a housing defining a storage space and a shelf disposed within the housing such that the compartment is divided. The shelf includes translucent material coated with flock and has non-flock areas. A light source is operatively coupled to the shelf to provide light illumination through the translucent material such that light illumination is illuminated into the compartment through the non-flock areas.

20 Claims, 6 Drawing Sheets

US 8,439,418 B1

ILLUMINATED SHELF VEHICLE STORAGE COMPARTMENT

FIELD OF THE INVENTION

The present invention generally relates to vehicle storage compartments, and more particularly relates to illumination of a vehicle storage compartment, such as a glove box.

BACKGROUND OF THE INVENTION

Automotive vehicles are commonly equipped with one or more storage compartments for storing items onboard the vehicle. Vehicles typically include a glove box located in the dashboard or panel at the front of the passenger compartment, generally on the front passenger side of the vehicle. The glove box typically includes a storage compartment and a door or lid that opens and closes to allow or prevent access to the compartment. Conventional vehicle glove boxes often employ one or more lights, such as an incandescent bulb to provide light illumination when the lid is in the opened position. More recently, some glove box compartments have been designed to include a shelf which creates a divided compartment storage space. The presence of a shelf can block poor light illumination of the storage space due to the shelf preventing light from fully illuminating the divided compartment. Accordingly, it is desirable to provide for enhanced illumination within a vehicle glove box having a shelf.

SUMMARY OF THE INVENTION

According to one aspect of the present invention, a vehicle storage compartment is provided. The vehicle storage compartment includes a housing defining a storage space. The vehicle storage compartment also has a shelf located within the housing such that the space is divided. The shelf includes translucent material coated with an opaque material and at least one light transmissive area. The vehicle storage compartment further includes a light source operatively coupled with the shelf to provide light illumination through the translucent material. Light illumination is illuminated into the space through the at least one light transmissive area.

According to another aspect of the present invention, a vehicle glove box is provided that includes a housing defining a storage space. The vehicle glove box also has a shelf located within the housing such that the space is divided. The shelf includes translucent material coated with flock and at least one non-flock area. The vehicle glove box further includes a light source operatively coupled with the shelf to provide light illumination through the translucent material. Light illumination is illuminated into the space through the at least one non-flock area.

According to a further aspect of the present invention, a method of forming a lighted vehicle storage compartment is provided. The method includes providing a housing defining a storage space. The method also includes masking one or more select areas of a shelf having a translucent material, applying flock onto an outer surface of the shelf and removing the masking to provide one or more exposed light illumination areas. The method further includes operatively coupling a light source with the shelf to provide light illumination through the translucent material such that light illuminates the space through the one or more exposed areas.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
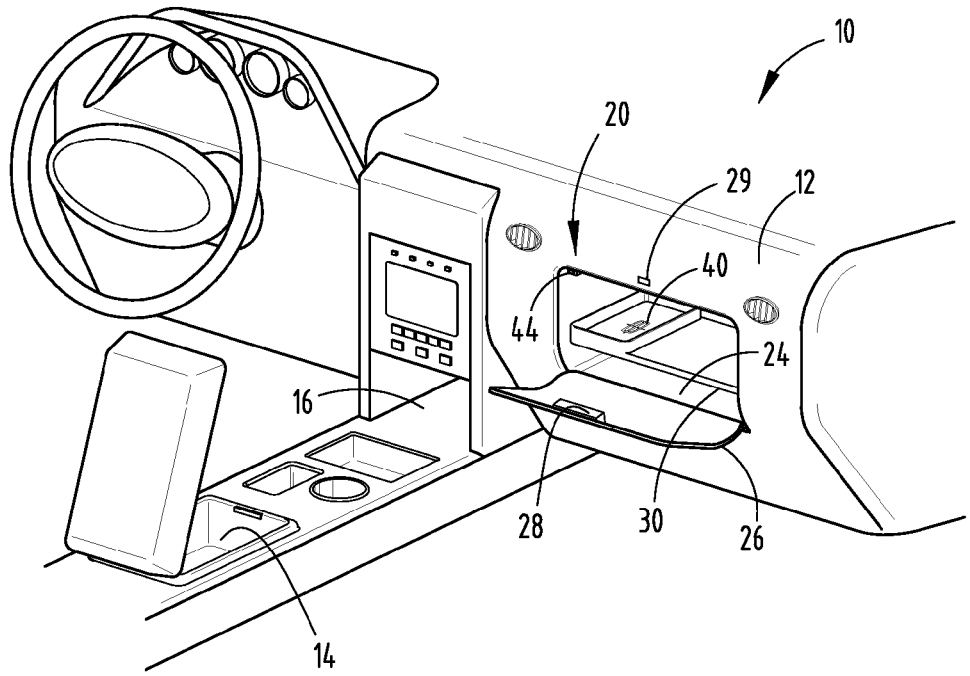
FIG. 1 is a perspective view of a vehicle dash panel having an illuminated shelf glove box storage compartment, according to one embodiment.
Figure 2:
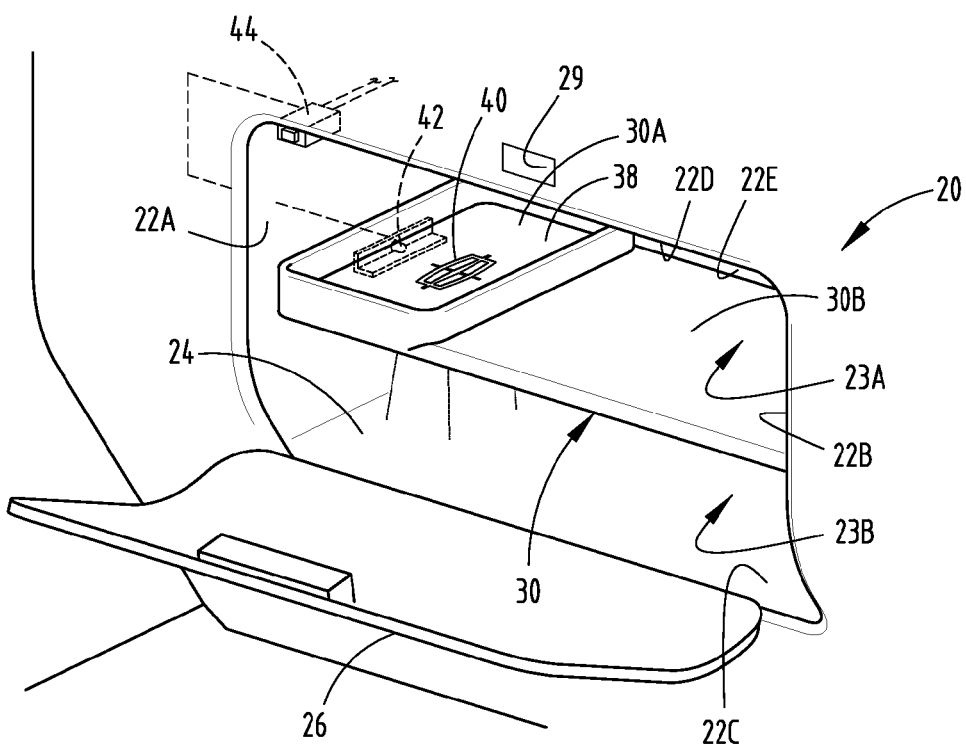
FIG. 2 is an enlarged view of the glove box storage compartment shown in FIG. 1.

For purposes of description herein, the terms "upper," "lower," "top," "bottom," "right," "left," "rear," "front," "vertical," "horizontal," and derivatives thereof shall relate to the glove box storage compartment as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, the front portion of a passenger compartment of an automotive vehicle 10 is generally illustrated having a glove box storage compartment 20, according to one embodiment. The glove box storage compartment 20 is integrated into a dash panel or dashboard 12 of the vehicle 10, generally at a location forward of a front seated passenger in the vehicle 10. The vehicle 10 is also shown including other storage compartments including a center console/arm rest storage compartment 14 and a center mounted storage bin 16 located forward of compartment 14, both located between driver and passenger seating areas.

The vehicle glove box storage compartment 20 includes a housing 22 defining a storage space 24 of a desired size and shape. Housing 22 is generally defined by walls which may include upstanding lateral side walls 22A and 22B, bottom wall 22C, top wall 22D, and an upstanding rear wall 22E. The shape of the storage compartment 20 may be generally rectangular, according to one embodiment. According to other embodiments, the storage compartment 20 may include an angled top or one or more other angled walls and may have various other shapes and sizes. The glove box storage compartment 20 further includes a front door or lid 26 that opens and closes to allow and prevent access to the storage space. The lid 26 is shown pivoting about a horizontal hinge near the bottom of the storage compartment. Lid 26 has a latch 28 aligned to engage a connector 29 in the dashboard 12 to secure the lid 26 in the closed position. It should be appreciated that other lids and securement mechanisms may be employed to control access to the storage compartment 20.

The storage compartment 20 includes a shelf 30 located within the housing 22 such that the overall storage space is divided. In the embodiment shown, the shelf 30 is shown extending substantially horizontal generally near the middle elevation of the compartment so as to divide the compartment into upper and lower storage spaces 23A and 23B, respectively. The shelf 30 may be oriented at other angles, such as a vertical orientation to divide the space into left and right sides, according to other embodiments. In the embodiment shown, the shelf 30 includes a trinket storage tray 30A and planar member 30B. The tray on its upper side 32 has upstanding side walls that define the shape of the storage tray 30A to enable the storage of items therein, such as trinkets. The remainder of the upper side 32 of shelf 30 and the lower side 34 is shown as substantially planar to generally serve as a shelf or a divider. The shelf 30 may be supported by one or more of the lateral side walls 22A and 22B and the rear wall 22E.

The shelf 30 includes translucent material that allows light rays to pass therethrough. The translucent material may include a molded in clear (MIC) translucent material that serves as a light pipe, according to one embodiment. As such, light illumination passes through the translucent material of the shelf 30.

The storage compartment 20 further includes a light module 44 having a light source 42 operatively coupled to the shelf 30 to provide light illumination into the translucent material of the shelf 30. The light source 42 may be a single light emitting diode (LED), according to one embodiment. According to another embodiment, a plurality of LEDs may be employed as the light source 42. Other light sources may be employed. Since the shelf acts as a light pipe, the light illumination passes through the translucent material of the shelf 30.

The shelf 30 is coated with an opaque material shown and described herein as flock or flocking 38 and includes at least one light transmissive or non-flock area 40. Flocking is defined as the process of adhering small fiber particles referred to as flock. In automotive applications, flocking is used to enhance appearance and tactility and prevent against noise such as squeaks and rattles. The flock 38 is an opaque layer that prevents substantial penetration of light rays. Light illumination is illuminated from each of the at least one non-flock areas 40 of the shelf 30 into the storage space to provide light illumination to illuminate the storage space.

According to one embodiment, the at least one non-flock area 40 is provided on both first and second sides of the shelf 30. The non-flock areas 40 may be provided in the form of a desired shape to give a desired appearance, such as the shape of a logo, according to one embodiment. In the embodiment shown, a non-flock area 40 is provided in the shape of a logo formed in the trinket tray 30A. It should be appreciated that the flock areas 38 and non-flock areas 40 may be provided at other locations to provide a desired light illumination for any particular size and shape and for a particular illumination area to illuminate both the upper storage space 23A and the lower storage space 23B.

Figure 3:
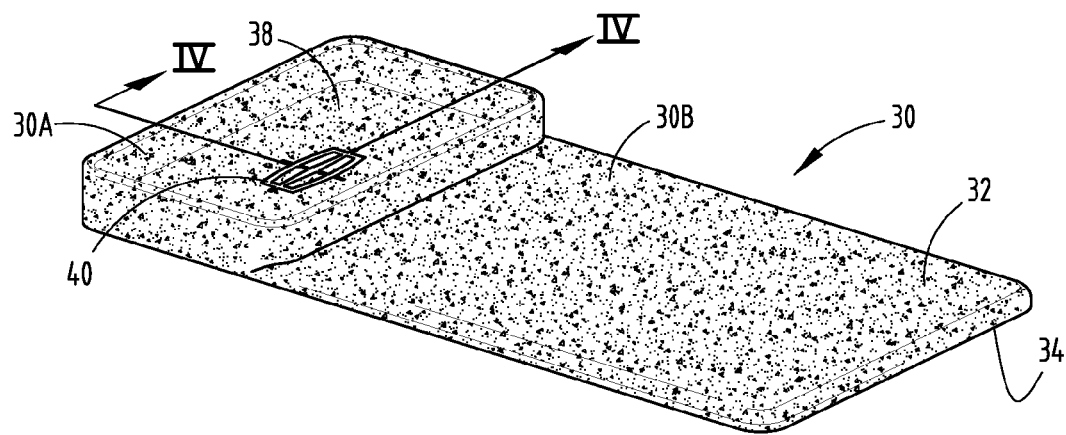
FIG. 3 is a perspective view of the illuminated shelf shown in FIG. 2.
Figure 4:
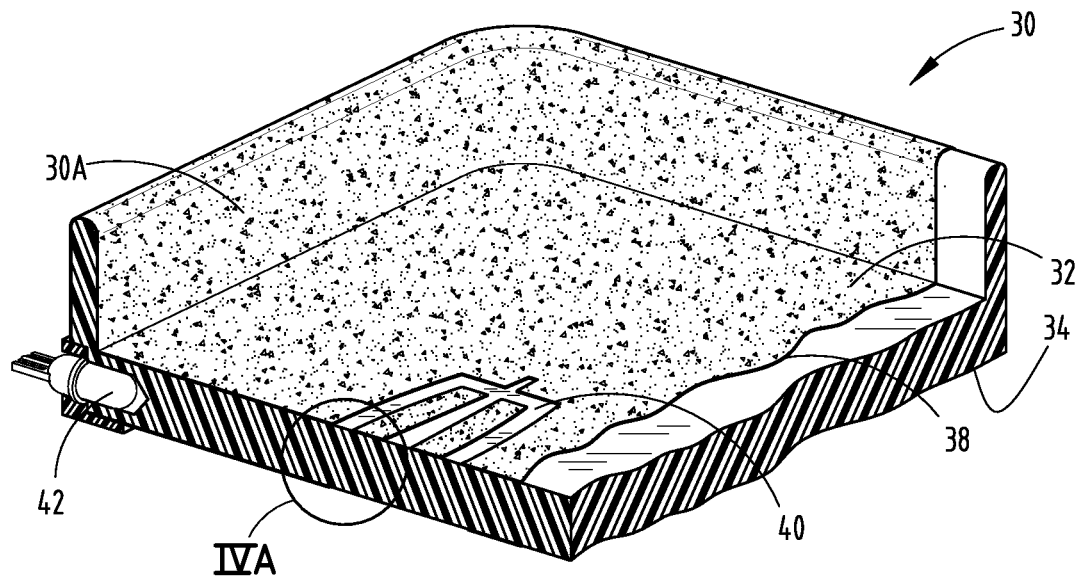
FIG. 4 is a cross-sectional view of the shelf taken through lines IV-IV of FIG. 3.
Figure 4A:
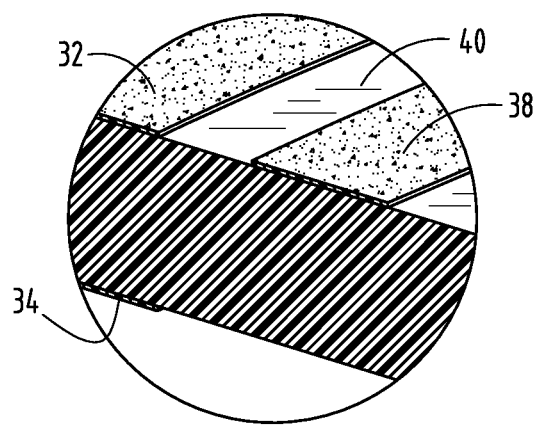
FIG. 4A is an enlarged view of section IVA shown in FIG. 4.

Referring to FIGS. 3-4A, the shelf 30 is illustrated having the top surface 32 with flock 38 provided everywhere on the surface of the shelf 30 except for logo area 40 provided in the trinket tray 30A. The flock area 38 includes an opaque flock that substantially prevents penetration of light rays such that light transmitted through the translucent material of the shelf 30 is not permitted to exit through the flock surface area 38. By masking one or more areas of the shelf 30 prior to applying the flock, the flock is prevented from being formed on the shelf 30 in the non-flock areas 40. The non-flock areas 40 thereby provide areas through which light transmitted within the translucent material may exit the shelf 30 to illuminate the storage compartment.

To form the flock and non-flock areas, the shelf 30 is initially formed of translucent material. Next, one or more select areas of the shelf 30 are masked as shown by area 40. The masking may include the use of an adhesive backed member, such as tape. Thereafter, flock 38 is applied, such as by spraying onto the entire outer surface of the shelf 30. The masking is then removed from areas 40 so as to leave non-flock areas 40 exposed such that light rays may be emitted therefrom when the shelf 30 is illuminated.

Figure 5:
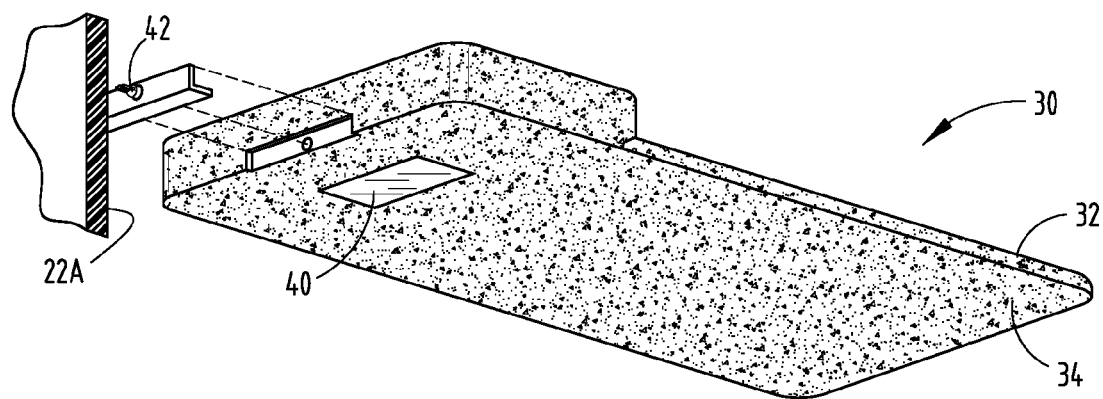
FIG. 5 is a bottom perspective view of the shelf, according to one embodiment.

The bottom surface of shelf 30 is illustrated in FIG. 5, according to one embodiment, having a non-flock area 40 below the non-flock area 40 forming logo 40 with the remainder of the bottom surface having flock. As such, light is able to penetrate through the non-flock area below the logo to illuminate the lower storage space 23B. Thus, light illumination exits from non-flock area 40 on the top side 32 of the shelf 30 to illuminate the upper storage space 23A and light illumination also exits from non-flock area 40 on the bottom side to allow light to illuminate the lower storage space 23B.

Figure 6:
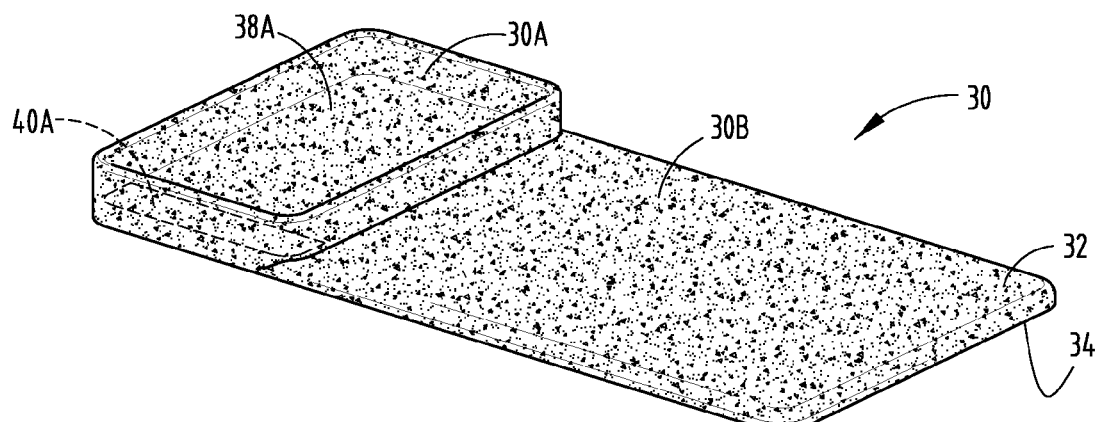
FIG. 6 is a perspective view of an illuminated shelf, according to another embodiment.
Figure 7:
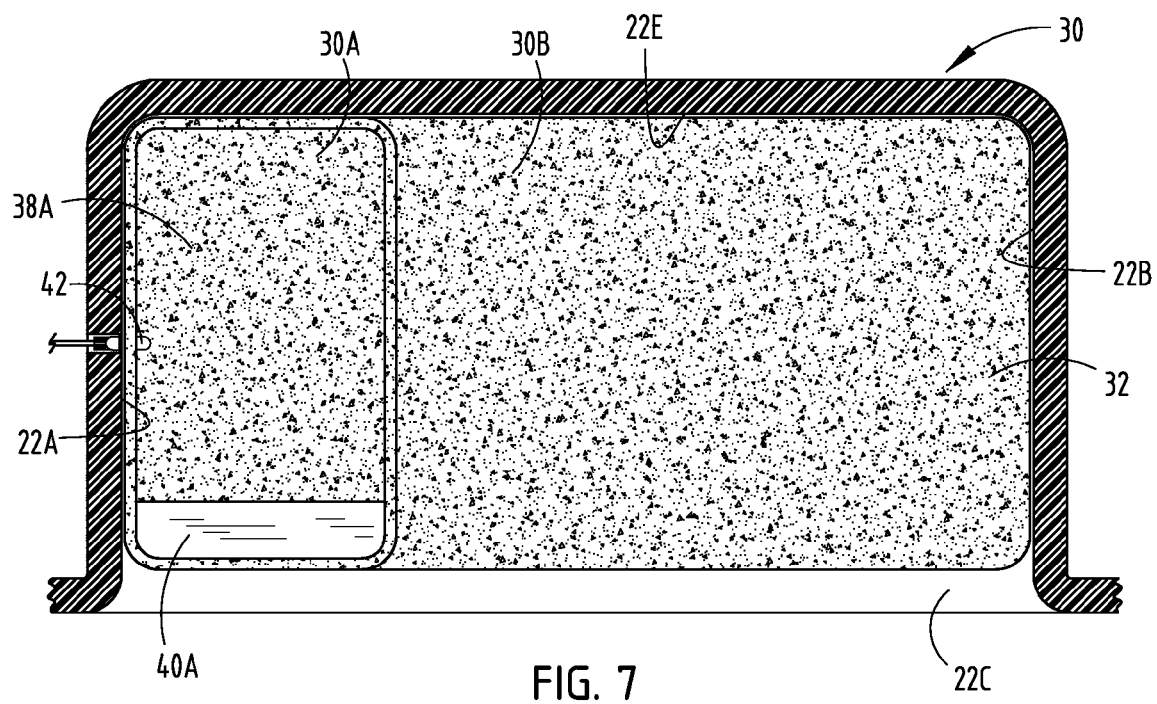
FIG. 7 is a top view of the shelf shown in FIG. 6.

Referring to FIGS. 6 and 7, a shelf 30 is illustrated having different flock area 38A and non-flock area 40A, according to a second embodiment. In this embodiment, the shelf 30, within the trinket tray 38A, has a non-flock area 40A formed just behind the front wall forming the trinket tray 30A. In this regard, from a normal viewing angle of the glove box by a passenger, the non-flock area 40A may be hidden from view due to the upstanding front wall of tray 30A. The non-flock area 40A allows light illumination from the top surface 30A of shelf 30 to illuminate the upper storage space 23A. Similarly, the bottom surface may have a non-flock area to illuminate the lower storage space 23B.

Figure 8:
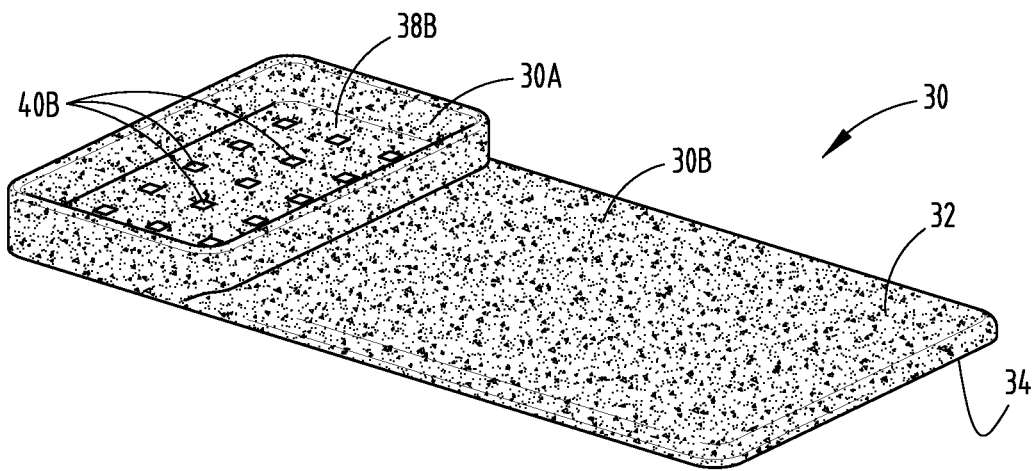
FIG. 8 is a perspective view of an illuminated shelf, according to a further embodiment.
Figure 9:
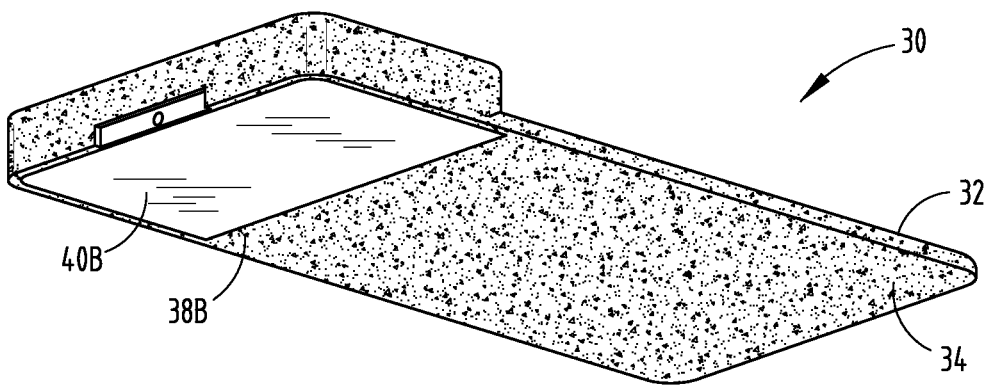
FIG. 9 is a bottom perspective view of an illuminated shelf, according to another embodiment.

Referring to FIGS. 8 and 9, a shelf 30 is illustrated having an alternative non-flock pattern, according to a further embodiment. In this embodiment, a plurality of non-flock areas 40B are formed in the upper surface 32 of trinket tray 30A of shelf 30. Each of the non-flock areas 40B allows light illumination to penetrate upward to illuminate the upper storage space 23A. The bottom surface 34 of shelf 32 below the trinket tray 38B is illustrated in FIG. 9 having a completely non-flock area 40B so as to allow light illumination to illuminate the lower storage space 23B. The remainder of the shelf is coated with flock 38B. It should be appreciated that various other single or multiple non-flock areas having various shapes and sizes may be employed on any of the top surface 32 and bottom surface 34 of the shelf 30, so as to provide a desired light illumination within the glove box storage compartment 20.

Figure 10:
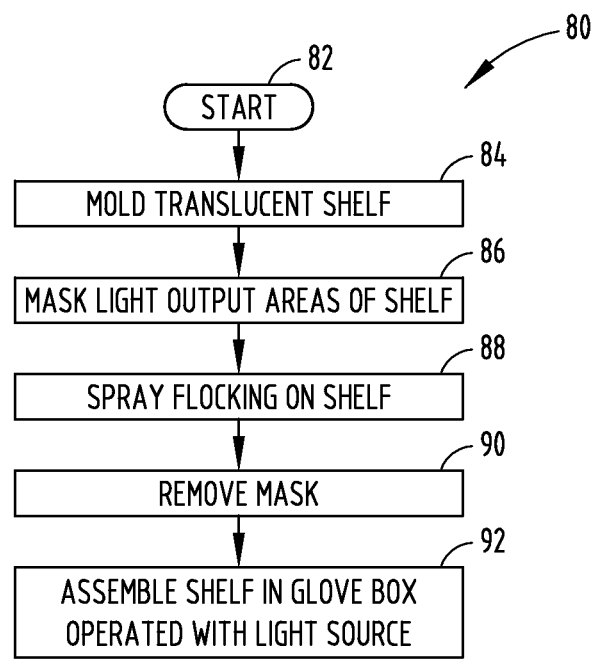
FIG. 10 is a flow diagram illustrating a method of making an illuminated shelf and assembling it into a vehicle glove box storage compartment, according to one embodiment.

Referring to FIG. 10, a method of forming a translucent shelf and the assembly of the shelf into a glove box of a vehicle is illustrated therein. The method 80 begins at step 82 and proceeds to step 84 to mold the translucent shelf. Next, routine 80 proceeds to step 86 to mask light output areas of the shelf, as desired for those areas where light illumination is desired. Next, at step 88 of routine 80 flock is sprayed onto the outer surface of the shelf 88. According to one embodiment, the entire outer surface of the shelf and the masked areas are coated with an opaque flock. At step 90, the masking is removed so as to provide open light illumination areas on the shelf. Routine 80 proceeds to step 92 to assemble the shelf in a glove box such that the shelf is coupled to an LED light source and operative therewith such that light illumination produced by the LED light source passes through the shelf and illuminates the storage compartment from the light illumination areas.

Accordingly, the storage compartment 20 advantageously employs a shelf 30 having a translucent material and flock with one or more non-flock regions so as to provide a desired light illumination within the storage compartment 20. By providing non-flock areas at select locations, enhanced light illumination may be achieved within a storage compartment employing the shelf. While a glove box storage compartment 20 is shown and described herein having an illuminated shelf, it should be appreciated that the storage compartment may include other storage type compartments on board a vehicle such as compartments 14 and 16, according to various other embodiments.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle storage compartment comprising:
    a housing defining a storage space;
    a shelf having first and second sides located within the housing such that the space is divided, the shelf comprising translucent material coated with an opaque material and having at least one light transmissive area; and
    a light source operatively coupled with the shelf to provide light illumination through the translucent material and exiting the at least one light transmissive area into the space.

2. The storage compartment of claim 1, wherein the opaque material comprises flock.

3. The storage compartment of claim 1, wherein the opaque material is provided on both the first and second sides of the shelf.

4. The storage compartment of claim 1, wherein the at least one light transmissive area has a shape that includes a logo.

5. The storage compartment of claim 4, wherein the shelf comprises a tray having the logo.

6. The storage compartment of claim 1, wherein the light source comprises at least one LED.

7. The storage compartment of claim 1, wherein the at least one light transmissive area comprises a first light transmissive area on the first side of the shelf and a second light transmissive area on the second side of the shelf.

8. The storage compartment of claim 1 further comprising an access door movable between an open position and a closed position.

9. The storage compartment of claim 1, wherein the storage compartment is a glove box.

10. A vehicle glove box comprising:
    a housing defining a storage space;
    a shelf located within the housing such that the space is divided, the shelf comprising first and second sides and translucent material coated with flock and having at least one non-flock area; and
    a light source operatively coupled with the shelf to provide light illumination through the translucent material and exiting through the at least one non-flock area.

11. The glove box of claim 10, wherein the flock is provided on both the first and second sides of the shelf.

12. The glove box of claim 10, wherein the at least one non-flock area has a shape that includes a logo.

13. The glove box of claim 12, wherein the shelf includes a tray and the logo is provided in the tray.

14. The glove box of claim 10, wherein the light source comprises at least one LED.

15. The glove box of claim 10, wherein the flock comprises an opaque flock.

16. The glove box of claim 10, wherein the shelf comprises a first non-flock area on the first side of the shelf and a second non-flock area on the second side of the shelf.

17. The glove box of claim 10 further comprising an access door movable between an open position and a closed position.

18. A vehicle storage compartment comprising:
    a housing;
    a shelf located within the housing and comprising first and second sides and translucent material partially coated with an opaque material and having a non-coated light transmissive area; and
    a light source operative to provide light illumination through the translucent material and exiting the light transmissive area.

19. The storage compartment of claim 18, wherein the opaque material comprises flock.

20. The storage compartment of claim 18, wherein the opaque material is provided on both the first and second sides of the shelf.

* * * * *